US 8,512,577 B2

(12) United States Patent
Fragiacomo

(10) Patent No.: US 8,512,577 B2
(45) Date of Patent: Aug. 20, 2013

(54) PROCESS AND APPARATUS FOR TREATING EXHAUSTED ABRASIVE SLURRIES FOR THE RECOVERY OF THEIR REUSABLE COMPONENTS

(75) Inventor: Guido Fragiacomo, Novara (IT)

(73) Assignee: SIC Processing AG, Hirschau (DE)

( * ) Notice: Subject to any disclaimer, the term of this patent is extended or adjusted under 35 U.S.C. 154(b) by 1272 days.

(21) Appl. No.: 11/993,633

(22) PCT Filed: Jun. 16, 2006

(86) PCT No.: PCT/IT2006/000461
§ 371 (c)(1),
(2), (4) Date: Mar. 25, 2008

(87) PCT Pub. No.: WO2006/137098
PCT Pub. Date: Dec. 28, 2006

(65) Prior Publication Data
US 2008/0250723 A1  Oct. 16, 2008

(30) Foreign Application Priority Data
Jun. 24, 2005  (IT) .............................. RM2005A0329

(51) Int. Cl.
B24C 9/00 (2006.01)
B01D 21/26 (2006.01)
C02F 1/38 (2006.01)
C09K 3/14 (2006.01)
B04B 5/10 (2006.01)
B05B 15/02 (2006.01)

(52) U.S. Cl.
USPC ........... 210/806; 210/800; 210/803; 210/638; 210/639; 210/650; 210/664; 210/663; 210/195.2; 210/202; 210/512.2; 210/295; 210/296; 210/787; 210/788; 494/36; 494/37; 451/87; 451/88

(58) Field of Classification Search
USPC ................ 210/638, 639, 650, 651, 663, 664, 210/669, 806, 512.1, 512.2, 195.1, 195.2, 210/200–202, 295–296, 787–788, 800, 803; 209/725–734; 451/36, 60, 446, 87–88; 494/36–37
See application file for complete search history.

(56) References Cited

U.S. PATENT DOCUMENTS

| 3,929,639 | A | * | 12/1975 | Turner et al. ................... 210/774 |
| 3,997,359 | A | * | 12/1976 | Dankoff et al. ................. 134/10 |
| 4,707,274 | A | * | 11/1987 | Donhauser et al. ........... 210/774 |
| 4,755,295 | A | * | 7/1988 | Donhauser et al. ......... 210/512.2 |
| 4,872,975 | A | * | 10/1989 | Benson .......................... 210/99 |
| 5,403,490 | A | * | 4/1995 | Desai ............................ 210/652 |
| 5,647,989 | A | * | 7/1997 | Hayashi et al. ............... 210/641 |

(Continued)

FOREIGN PATENT DOCUMENTS

WO   WO 02/096611 A1 * 12/2002

Primary Examiner — David C Mellon
(74) Attorney, Agent, or Firm — Arent Fox LLP

(57) ABSTRACT

Process and apparatus for completely recovering the reusable components of an abrasive slurry used in slicing crystalline materials of silicon, quartz or ceramics when it becomes exhausted and enriched with undesired waste matter. The process consists of an initial centrifuge separation of the exhausted slurry as such and of a wet size-sorting treatment of the fraction containing the abrasive grains obtained from the centrifuge, carried out in a battery of hydrocyclones or centrifuges connected in series. The section for the recovery and purification of the abrasive grains comprises a multifunctional apparatus that performs all the required operations within a single pressure vessel.

26 Claims, 4 Drawing Sheets

(56) References Cited

U.S. PATENT DOCUMENTS

| | | | |
|---|---|---|---|
| 5,830,369 A * | 11/1998 | Toyama | 210/773 |
| 6,001,265 A * | 12/1999 | Toyama et al. | 210/712 |
| 6,322,710 B1 * | 11/2001 | Katsumata et al. | 210/740 |
| 6,929,537 B2 * | 8/2005 | Kajimoto | 451/60 |
| 7,820,126 B2 * | 10/2010 | Fallavollita | 423/349 |
| 2004/0144722 A1 | 7/2004 | Zavattari et al. | |

* cited by examiner

PROCESS AND APPARATUS FOR TREATING EXHAUSTED ABRASIVE SLURRIES FOR THE RECOVERY OF THEIR REUSABLE COMPONENTS

CROSS-REFERENCE TO RELATED APPLICATION

This application is a National Stage entry of International Application No. PCT/IT2006/000461, filed Jun. 16, 2006, the entire specification claims and drawings of which are incorporated herewith by reference.

The present invention concerns a process and relative apparatus for treating exhausted abrasive slurries for the recovery of their reusable components. More specifically, the invention concerns a process, with the necessary equipment for implementing it, for completely recovering the reusable components contained in an abrasive slurry used in cutting crystalline materials of silicon, quartz or ceramics when it is exhausted and enriched with undesired waste matter. The process enables the total recovery of the still reusable abrasive grains combined in the exhausted slurry as well as the total recovery of the suspending liquid of the abrasive slurry, in order to reuse both components in the manufacturing process.

As is known, the production of components for applications in the electronic and photovoltaic energy field makes use of thin silicon discs ("wafers") obtained from either polycrystalline or monocrystalline silicon ingots or ingots by cutting the ingot perpendicularly to its length. Typically, this slicing operation is carried out by means of a cutter or wire saw, in which a metal wire of considerable length and suitable mechanical resistance, wound in a system of rollers and spools, is contacted while moving with the ingot, perpendicularly to the ingot length, at the points where the cut it to be made. At the same time, a slurry containing abrasive grains or parades (abrasive slurry) is fed to the contact area between the cutter wire and the ingot.

The conventional abrasive slurries used for cutting ingots of silicon, quartz or other ceramic material with a wire saw consist of a suspending, lubricant or cooling fluid, such as a mineral oil, or water-soluble organic liquids of high molecular weight (in particular, polyethylene glycol, PEG) in which abrasive particles of suitable hardness, generally of silicon carbide (SiC), are suspended.

During the slicing operation, part of the abrasive grains lose their ability to assist in the cutting process, since they break down into smaller particles and are thus no longer suitable for the cutting operation; this is shown by the fact that the grain size distribution of the abrasive particles decreases to lower average values. At the same time, the abrasive slurry becomes enriched with fine particulate coming from the silicon ingot being cut and also from the slicing wire (mostly iron), as well as from the metal pipes of the apparatus itself.

As the amount of fine particulate increases, the abrasive slurry loses its mechanical characteristics and the efficiency of the slicing operation decreases, to the extent that the slurry becomes ineffective and must be discarded and replaced with fresh abrasive slurry.

The exhausted abrasive slurry that is discarded can be disposed of by thermodestruction, but this involves evident inconvenience not only because of the loss of reusable components, but also as regards the environmental impact. Actually, thermodestruction is a waste disposal technique that is not devoid of negative effects, both as regards environmental and atmospheric pollution, for the possible presence of harmful substances in the flue gases given off or in the ashes, and as regards the inevitable contribution to the greenhouse effect due to the production of carbon dioxide originated by the combustion of organic substances.

Alternatively to incineration, the abrasive slurry may be sent to biological waste treatment plants for municipal or industrial waste, but the resulting sludge must then go to a landfill.

In both the aforesaid cases, apart from the environmental problem due to the need to dispose of the waste products, there is the considerable economic inconvenience of losing a considerable amount of still reusable abrasive grains contained in the exhausted slurry, i.e. those grains which are still of the right size to be used in an abrasive slurry. Moreover, there is also the loss of the liquid product making up the suspending or cutting fluid. The latter (which may be based on mineral oil or on an organic liquid, such as PEG), if efficiently purified from the suspended fine particles of metal residues and of silicon, as well as from the non-reusable abrasive grains, would be perfectly reusable in the process because it keeps its own characteristics unaltered during the process itself.

Since the need to separate and recover the components of an exhausted abrasive slurry is a widely felt problem in the field, several techniques have been proposed in order to implement this recovery, at least in part. Both in the case of oil-based abrasive slurries and in that of water-soluble organic liquid-based slurries, all the proposed methods varyingly combine the following basic operations.

a) preliminarily reducing the viscosity of the exhausted slurry, and namely by adding a solvent or by heating, in order to prepare it for the next operations;
b) separating the abrasive grains by wet size-sorting, such as by centrifugation or by passing the slurry through a hydrocyclone (a static separator of solid particles entrained by a liquid, which exploits the action of centrifugal force);
c) filtering the liquid phases resulting from abrasive grain separation;
d) distilling the liquid mixtures of solvent and cooling fluid making up the filtrate;
e) drying the reusable abrasive grains.

The hitherto known technologies, as will be made clearer below with reference to some examples of the prior art, present various inconveniences to a greater or lesser extent, including an insufficient quality of reusable abrasive grains in terms of size or in terms of the presence of fine silicon and/or fine metal particulate, an excessive complexity of the process or a high number of operations necessary, a considerable consumption of solvent that is added for separation, or the lengthy times necessary for the treatment, and/or low yields of the various components.

The European patent application EP-A-786317 (Shin-Etsu Handotai Co.) describes a system for reusing an exhausted abrasive slurry of the oil-based type wherein water is first added to the exhausted slurry in order to reduce its viscosity, and then the resulting mixture is fed to a hydrocyclone to separate the reusable abrasive grains. As is known, in a hydrocyclone the feed to be treated is fed from the top at high speed and tangentially into the apparatus, so that the centrifugal force pushes the heavier particles towards the sides of the container. Moving in a spiral manner, the heavier particles are then collected in the container's conical bottom (underflow), while the clarified liquid comes out at the top from a central duct (overflow). In the solution proposed in the aforesaid document, the hydrocyclone overflow, that contains the oily cutting fluid, wafer and all those solid particles that have not been sorted out by passing through the hydrocyclone, is then fractioned into three phases by centrifugation. This operation yields an oily phase that, is reused in the cutting process, the water that is reused in the preliminary exhausted slurry dilution phase, and a residue suspension containing the solids to be discarded, that is sent to the waste treatment plant.

It is obvious that the process described does not allow obtaining a high quality of the fraction of abrasive grains recovered from the hydrocyclone, if only because this fraction contains a certain amount of finer solid particles, including a quantity of silicon powders and metal powders (mainly iron) that are collected in the exhausted slurry as residues of the cutting operation. The unwanted fine powders tend to build up in the abrasive slurry as it is recovered and reused according to the process described in the aforesaid document. The same applies for the oily slurry recovered from the centrifugation operation, which inevitably contains traces of fine solid particles that return to the cutting process and accumulate in the system.

A very similar process to the one mentioned above is described in the international patent application No. WO 01/43933 (Fraunhofer-Gesellschaft zur Forderung der angewandten Forschung e.V.), which describes a method meant to be an improvement of the previously described one. The operational stages are virtually the same as the ones described in document EP-A-786317, but the auxiliary process fluid that is added in the preliminary phase in order to reduce the viscosity of the exhausted slurry (which was water in the previous case of oil-based abrasive slurry) is selected in this case so that it is miscible with the suspending liquid of the abrasive slurry. Therefore, in the case of oil-based abrasive slurries, the diluting fluid is selected from among the lipophilic solvents (such as hexane or heptane), while in the case of water soluble-based slurries amphiphilic solvents are used (such as acetone). This enables creating a stable suspension of fine particles to be discarded and improving the separation of the abrasive grains, which are recovered in the first phase of treatment by wet sizing.

The suspension obtained after separating the reusable abrasive grains must be treated by distillation, after the necessary filtering of the suspended fine solids, given that in this case the liquid added is miscible with the suspending fluid.

In this case too, the recovered abrasive grains are not completely free from non-reusable grains and of traces of fine metal and silicon particles (up to 2%), with an obvious reduction of the quality of the abrasive material to be recovered and reused in the cutting process. Moreover, here too, part of the metals remain in solution in the suspending fluid that is reused in the process, and gradually build up.

The European patent EP 0791385 (Shin-Etsu Handotal Co. et al.) describes a method for the separation and reuse of exhausted abrasive slurries similar to the two methods described above, but mainly intended for use in the case of water soluble-based slurries. Here, too, the first operation consists of diluting the suspension with water in order to reduce its viscosity. Then, the mixture is treated by wet size-sorting to separate the reusable abrasive grains; here, too, the preferred apparatus is a hydrocyclone.

The part of the process that differs most from the aforesaid two systems concerns the recovery and separation treatment of the liquid suspension obtained from the overflow of the hydrocyclone. A coagulating agent is added to this liquid suspension in order to favor the separation of suspended solids, and then the whole lot undergoes distillation, from which water is recovered, as the lightest fraction, which is reused for the initial dilution of the exhausted slurry.

The mixture of water-soluble slurry, suspended solids and coagulant undergoes solid-liquid separation treatment, preferably by centrifugation, to obtain, on the one hand, a solid residue to be discarded and, on the other, the water-soluble slurry. This can be reused in the cutting process after further treatments, among which the addition of a dispersion agent to adjust the viscosity of the slurry.

Both as regards the quality of recovered abrasive grains and as regards the purity of the slurry that is fed back into the cutting process, the same considerations hold as the ones made for the two previous processes mentioned above.

The U.S. Pat. No. 6,010,010 (Elektroschmelzwerk Kempten) proposes a completely different process for treating exhausted abrasive slurries than the methods considered so far. In this case, in the first phase the whole solid component is dried, such as via evaporation under vacuum or by spray-drying, which involves heating the exhausted slurry to some extent. Then, the reusable abrasive particles are separated from the finer waste material by conventional dry size-sorting methods. The evaporated liquid, largely consisting of the suspending fluid of the abrasive slurry, is condensed and can be reused in the cutting process.

The technological proposal of totally drying the solids suspended in the exhausted slurry, and then cyclically evaporating and recondensing the suspending fluid, is evidently inconvenient as regards energy consumption, and also exposes the suspending liquid to heat stresses that can favor its degradation. If the suspending liquid is oil, the structure of the condensate may be different from the one of new oil, while if the liquid is polyethylene glycol (PEG), the process would not work since PEG, having a high molecular weight, cannot be evaporated without damaging its structure because of the high temperature necessary for evaporation. Moreover, the high temperature evaporation process creates iron-silicate agglomerates that are not separable and remain with the abrasive.

In addition, the separation of the dried solid with any dry-sorting method (screening, sifting, pneumatic sorting via cyclone) offers a poor yield in terms of recovered reusable abrasive particles and, in this case too, does not avoid contamination by fine silicon and metal powders.

The European patent EP 0968801 (MEMC Electronic Materials and Garbo Servizi) describes a method aimed at regenerating an exhausted abrasive slurry of the water soluble-based type, wherein the exhausted abrasive is firstly heated to reduce its viscosity and then subjected to an initial separation by filtering. This yields a clarified liquid largely composed of cutting fluid with traces of fine powders, and an agglomerate of wet powders containing, along with a small quantity of cutting liquid, almost all the solids suspended in the exhausted slurry. The wet powders are then diluted with water and separated using a hydrocyclone, which produces a fraction of grains of larger size (underflow) essentially containing the reusable abrasive grains, and an "overflow" traction composed of the fine particles (non-reusable abrasive, silicon powder and metal powders) suspended in water, mixed with a smaller amount of suspending fluid. The fraction containing the abrasive grains is oven dried, while the overflow fraction from the top of the hydrocyclone is filtered, recovering the aqueous flow that serves to dilute the wet powders before the hydrocyclone separation process and obtaining a solid residue essentially composed of silicon powder and metals.

The suspending liquid, which is recovered from the first, filtering of the hot exhausted slurry, is freed from further traces of powders by means of a further filtering operation, after which it is sent to the cutting process.

As regards the quality of the recovered abrasive grains, neither the process described in patent EP 0968801 allows obtaining a virtually complete elimination of the fine particulates, which remain in an amount of about 2% in the abrasive grains sent back to the cutting process. Another non-negligible drawback in the process under examination, besides the need to heat the exhausted slurry beforehand in order to reduce its viscosity, is the need to add considerable amounts of water to the wet powders obtained from the first filtering in order to carry out the separation process in the hydrocyclone. Finally, it must also be noted that a smaller amount of cutting fluid is lost because it is left in the solid after the first filtering.

Another proposed process for treating exhausted abrasive slurries that have a water soluble liquid base (and, specifically, polyethylene glycol, PEG) is described in international patent application No. WO 02/096611 (MEMC Electronic Materials and Garbo Servizi), wherein the exhausted slurry is first divided into a solid fraction and a liquid fraction largely devoid of solids, by means of filtering. The separated solids, which include reusable abrasive grains, non-reusable grains and fine silicon and metal powders, as well as a minor amount of suspending liquid, is washed in water and then treated with a sodium hydroxide solution (alkaline leaching agent) in order to effect the dissolution of the silicon fine particulates and eliminate them. The filtrate obtained from the aforesaid operation is then treated with an acid leaching agent (such as a sulfuric acid solution) in order to effect the dissolution of the metal powders and eliminate them, thus obtaining a mixture of only grains of reusable and non-reusable abrasive material after washing the solid fraction. This solid fraction, freed from fine contaminants by chemical etching, can be separated according to grain size into reusable grains and exhausted grains—via treatment in a hydrocyclone, obviously upon a suitable dilution with water.

Summing up, unlike the other methods described above, this complex series of operations enables the complete elimination of the unwanted fine particulates normally remaining on the abrasive grains recovered from the exhausted slurry and fed back into the process.

It must be noted that after each of the said operations of chemical etching, washing and filtering, the solid residue must be taken from the filtering equipment and fed to the next phase, something that also has the drawback of causing further wear of the abrasive grains to be recovered.

As regards the recovery of the liquid fraction initially separated by filtration from the exhausted slurry, the application WO 02/096611 reports that said fraction can be directly reused in the cutting process as a cutting fluid. This fraction is mixed with a smaller amount of liquid recovered by washing the cake of the first filtering, so it may be considered that the recovery of the water-soluble slurry is practically 100%.

A big drawback with the process described above, besides the complexity of the series of operations necessary for recovering and purifying the solid fraction, is the high consumption of chemical agents in solution necessary for the leaching stage.

On the basis of this prior art, an object of the present invention is thus to provide a method for treating exhausted abrasive slurries, of the type used for slicing silicon wafers by means of wire saw machines, in order to recover reusable components, which method enables a virtually complete recovery of the still reusable abrasive grains and suspending liquid, by means of an economically convenient process of non-complex management. The method must also guarantee the complete elimination—from the recovered and reusable material—of the unwanted components of fine powder coming from the cutting process and from the broken down and spent abrasive material.

Starting from the known and previously illustrated processes, and namely from the methods envisaging, as the first operation in the separation of the exhausted slurry, the recovery of reusable abrasive grains from the rest of the suspension by means of wet size-sorting in a hydrocyclone, according to the present invention a system has been devised wherein this wet-sorting is carried out in an optimal manner not in one hydrocyclone but—after an initial separation by centrifugation of most of the cutting liquid together with part of the finer solids—in a battery of hydrocyclones suitably connected in series. The hydrocyclones, which can also be replaced by a similar battery of centrifuges connected in series, are fed in counter-current with a clarified liquid suspension recycled from one of the subsequent phases of treatment of the suspending liquid and suitably heated. In the proposed hydrocyclones battery, the suspension enriched of abrasive grains obtained as underflow (UF) from the bottom of one hydrocyclone feeds the next hydrocyclone in the series, and from the underflow of the last one of these a suspension of abrasive particles of optimized granular size is obtained. The exhausted slurry that is fed to the initial solid-liquid separator centrifuge does not need any preliminary treatment of dilution or heating, and the amount of solvent fluid introduced into the process (typically water, in the case of a water soluble-based suspension) solely corresponds to the solvent necessary for replacing the, albeit negligible, amount lost downstream.

According to another innovative aspect of the invention, the UF suspension recovered from the hydrocyclones battery is further treated in order to recover from if the residual amount of suspending liquid and solvent contained therein, and to further purify the abrasive grains, carrying out all the necessary operations within a single multifunctional filtering apparatus without having to transfer the solid between one operation and the next. In this phase of filtering and treatment of the recovered abrasive grains, the suspension coming from the hydrocyclones battery is filtered and the filter cake is subjected to the subsequent operations of hot washing, leaching by chemical etching—both acid and alkaline—of the fine particles still contained in the solid agglomerate, and then further washing and drying of the thus purified grains, without ever removing the solid material from the apparatus. This leads to a considerable saving in time and processing costs, and a better quality of abrasive grains obtained. Obviously, as this kind of apparatus operates with a discontinuous cycle, it must be disconnected from the previous continuous wet size-sorting treatment. To this end, the process envisages a buffer tank for the UF of the hydrocyclone battery, from which the suspension is taken for its further treatment, in the multifunctional filtering apparatus.

Therefore, the present invention specifically provides a process for treating exhausted abrasive slurries including a suspending liquid, reusable abrasive grains, fine abrasive grains, fine silicon particles and fine metal particles, comprising the following steps:
  a) separating an exhausted slurry by wet size-sorting treatment in: i) a liquid suspension containing reusable abrasive grains in a mixture of suspending liquid with a liquid solvent and ii) a liquid suspension in the same mixture containing the fine abrasive grains as well as the fine silicon particles and fine metal particles;
  b) recovering the suspending liquid from the said liquid suspension containing the fine grains and particles by means of solid-liquid separation treatments combined with liquid solvent distillation;
characterized in fact that the said wet size-sorting treatment of step a) is carried out by treating the mixture in a liquid-solid centrifugal separator that in turn feeds, with the resulting solid-containing fraction, a battery of at least two hydrocyclones or two centrifuges connected in series, fed in counter-current with a liquid fraction comprising a portion of clarified liquid obtained from the said steps b) of recovery of the suspending liquid, thus obtaining from the underflow of the last hydrocyclone or last centrifuge of the battery a liquid suspension containing the reusable abrasive grains and which suspension is substantially free from fine abrasive grains. Preferably, the number of hydrocyclones or centrifuges of the battery/according to the present invention is comprised between three and six.

The liquid-solid centrifugal separator carrying out the first treatment on the exhausted abrasive slurry separates it into two suspensions, one rich in solids that contains an average of 10-30% of suspending liquid and solid particles over 2 µm in size, and the other an essentially liquid suspension containing 70-90% of the suspending liquid and the smaller, finer solid particles.

Still according to the present invention, the liquid suspension containing the reusable abrasive grains obtained from the underflow of the last hydrocyclone or centrifuge of the battery is further treated in order to obtain abrasive grains in dry state purified of traces of fine grains and particulates, in a multi-functional apparatus implementing the following consecutive steps without any transfer of material; filtering the said liquid suspension, washing the resulting grains and leaching from them, by chemical etching, any fine silicon and metal particles and, finally, drying the grains of purified abrasive material.

Unlike in the known systems of the prior art, the exhausted slurry is directly fed to the wet size-sorting section, without adding any liquid, in order to recover the fraction containing the reusable abrasive grains. The amount of liquid solvent that is added to the system, in another section of the apparatus, only serves to replace the, albeit minor, quantity of solvent lost from the system.

According to one specific embodiment of the present invention, the following consecutive operations are carried out in the multifunctional apparatus for filtering and treating the abrasive grains:
  A) filtering the liquid suspension containing the reusable abrasive grains obtained from the underflow of the last hydrocyclone or last centrifuge of the battery;
  B) washing the solid fraction resulting from operation A), using a liquid solvent;
  C) leaching, by chemical etching, the fine silicon and metal particles of the solid fraction resulting from operation B), with the production of silicate solutions and solutions of salts of metal impurities, dissolved in a waste liquid;
  D) washing the solid fraction resulting from operation C), using a liquid solvent;
  E) drying the abrasive grains making up the solid fraction resulting from operation D).

Preferably, the operation C) of leaching by chemical etching is carried out in the following two consecutive stages:
  C1) caustic etching of the fine silicon particles by treating the solid fraction resulting from operation B) with an alkaline agent solution, in particular, caustic soda or potassium hydroxide;
  C2) alkaline etching of the metal fine particles by treating the solid fraction resulting from operation C1) with an acid agent solution, in particular, nitric acid, hydrochloric acid, oxalic acid, sulfuric acid, citric acid or tartaric acid or their mixtures.

In the process according to the present invention, the liquid fraction feeding in counter-current the battery of hydrocyclones or centrifuges preferably includes, besides a portion of clarified liquid obtained from the steps b) of recovery of the suspending liquid, also the liquid obtained from operation A) of filtering the suspension obtained from the bottom of the last hydrocyclone or centrifuge of the battery and the liquid obtained from operation B) of subsequent washing.

From the foregoing, it appears that the process according to the present invention can ideally be subdivided into three sections. The first section consists of a solid-liquid centrifugal separator (centrifuge) and a battery of hydrocyclones or of centrifuges, while the second completes the treatment of abrasive grains recovery with the various operations carried our with two filters and with an additional vessel in which the chemical reactions are carried out, or, better, in the specific multifunctional apparatus. The third section consists of the series of operations carried out on the overflow from the hydrocyclone or centrifuge battery integrated with the liquid fraction separated by the initial solid-liquid centrifugal separator, in order to eliminate the unwanted fine particulates and to be able to reuse the suspending liquid in the cutting process.

According to some most preferred embodiments of the present invention, the said liquid suspension ii) containing the fine abrasive grains and the fine silicon and metal particulates, obtained from the overflow of the first hydrocyclone or first centrifuge of the said battery, is further treated in a safety hydrocyclone or centrifuge, and the suspension obtained from the overflow of the said safety hydrocyclone or centrifuge undergoes the said steps b) of recovery of the suspending liquid. The safety hydrocyclone or centrifuge is designed to protect the first hydrocyclone (or first centrifuge) of the battery from the risk of saturation.

Specifically, said steps b) of recovery of the suspending liquid, carried out in the third section of the proposed process, comprise, as a first step, a filtration, which also receives the liquid obtained from operations A) and B) sent to the multifunctional apparatus for abrasive grain treatment. The filtration yields a clarified liquid substantially containing the suspending liquid, the liquid solvent and the fine metal particles, which is then subdivided in two portions: the larger one of said portions makes up the said portion of clarified liquid feeding in counter-current upstream the battery of hydrocyclones or centrifuges and the smaller one undergoes further treatment in order to recover the suspending liquid. As will be more evident below, with reference to the detailed description of some specific embodiments of the present invention, the larger portion of clarified liquid normally makes up 40-90% of the clarified liquid obtained by filtering the OF of the hydrocyclone or centrifuge battery, and is preferably heated before being fed into the said battery.

Preferably, the smaller portion of clarified liquid, which is further treated to recover the suspending liquid, is joined with the fraction obtained from the said liquid-solid centrifugal separator carrying out the first operation of the process. Then, the liquid may be further purified according to one or the other of two alternative procedures. On the basis of the first alternative procedure, the liquid fraction resulting from the said addition is alkalinized to pH 9-10 by adding an alkaline solution, and is then subjected to microfiltration to eliminate the iron hydroxide that is formed upon alkalinization. The clarified liquid from the microfiltration is neutralized by adding an acid solution and is subjected to distillation to separate the said solvent from the suspending liquid by evaporation (the solvent being purposely selected so as to be the lighter one of the two components). Hence, the suspending liquid is further purified by filtration, eliminating the salt that is formed upon neutralization.

According to an alternative procedure for purifying the suspending liquid, the said smaller portion of clarified liquid undergoes microfiltration, in order to eliminate most of the fine metal particles from the clarified liquid, and the clarified liquid obtained from the microfiltration is further subjected to treatment on ion-exchange resins in order to eliminate the metal ions and other impurities from the said clarified liquid.

For an optimal separation of the last traces of the undesired fine particulates, the said treatment on ion-exchange resins includes a first treatment on cationic resins and a second treatment on anionic resins.

The clarified liquid obtained from the treatment with ion-exchange resins consists of a mixture of suspending liquid and liquid solvent, devoid of suspended solids or metals in solution. Such mixture is, finally, subjected to distillation to separate—by evaporation—the said solvent from the purified suspending liquid. The suspending liquid remaining after this operation is directly fed back into the cutting process and has the same characteristics as fresh cutting fluid.

In both of these alternative procedures for recovering the suspending liquid, after evaporation the solvent is condensed and reused in the washing phases B) and/or D) of the abrasive grains in the said multifunctional apparatus. Thanks to the recovery and reuse of the solvent, the whole process uses up minor quantities of the solvent itself, essentially equivalent to the quantity of residual water left in the abrasive material cake at the end of the first process of hot washing of the recovered abrasive grains.

It must be noted that the process according to the present invention may be implemented both for treating oil-based abrasive slurries and for treating water soluble-based abrasive slurries, which are currently more widespread. In the latter case, the preferred suspending liquid is polyethylene glycol (PEG) and the liquid solvent is water.

According to a further aspect thereof, the present invention provides an apparatus for treating exhausted abrasive slurries according to the process previously described, including the following interconnected elements in sequence:

I. a liquid-solid separator centrifuge that feeds with the solid-containing fraction separated thereby the first one of a battery of at least two hydrocyclones or centrifuges connected in series; the underflow from each hydrocyclone or centrifuge feeding the next hydrocyclone or centrifuge, together with the overflow from the next but one hydrocyclone or centrifuge, the said battery of hydrocyclones or centrifuges being fed in counter-current with a liquid fraction comprising a portion of clarified liquid obtained from the said steps b) of recovery of the suspending liquid;

II. a multifunctional apparatus for filtering and treating the abrasive grains designed to carry out the following consecutive steps without any transfer of material: filtration of the liquid suspension containing the abrasive grains obtained from the underflow of the last hydrocyclone or centrifuge, subsequent washings of the resulting grains and leaching from them, by chemical etching, of the silicon and metal fine particulates and, finally, drying of the purified granular abrasive material;

III. a treatment section of the said liquid suspension ii) containing the fine abrasive grains and the fine silicon and metal particles obtained from the overflow of the first hydrocyclone or centrifuge of the said battery in order to recover the suspension liquid According to a preferred embodiment of the apparatus, the hydrocyclone or centrifuge battery includes a further safety hydrocyclone or centrifuge receiving the overflow of the first hydrocyclone or centrifuge of the said battery, and whose overflow feeds the said section for the treatment of liquid suspension ii) in place of the overflow of the said first hydrocyclone or centrifuge.

Preferably, as already noted, the said multifunctional apparatus of filtration and treatment of the abrasive grains is a batch-operating apparatus consisting of a pressure vessel containing a filter device on which the abrasive grains are housed during filtration and all subsequent phases of washing, leaching and drying.

Between the said two sections I. and II. of the apparatus according to the present invention there is provided a buffer tank for collecting the abrasive grain suspension obtained from the said battery of hydrocyclones or centrifuges, thereby disconnecting the continuously operating section of the plant from the section operating in batch.

According to certain specific embodiments of the proposed apparatus, the section III. of treatment of the liquid suspension obtained from the overflow of the first hydrocyclone or centrifuge, or from the safety hydrocyclone or centrifuge, includes a filter device from which the exiting clarified liquid is sent in part to further apparatuses in order to recover the suspending liquid and in part to feed in counter-current the said battery of hydrocyclones or centrifuges. Moreover, the said further apparatuses for the recovery of the suspending liquid include a microfiltration device and an evaporator suitable to separate the solvent in the vapor form from the suspending liquid and, possibly, a filtering device to eliminate the saline residues from the suspending liquid left over from the said distillation.

According to an alternative arrangement of the system, the said further apparatuses for the recovery of the suspending liquid also include one or more devices for treatment by ion-exchange resins.

The specific features of the present invention, as well as its advantages and relative operational modalities, will be mere evident with reference to the detailed description below, presented merely for exemplification purposes and concerning some of its preferred embodiments. The same are illustrated in the attached drawings, wherein FIG. 1 shows an overall block diagram of a first process for treating exhausted abrasive slurries according to the present invention;

Figure 1:
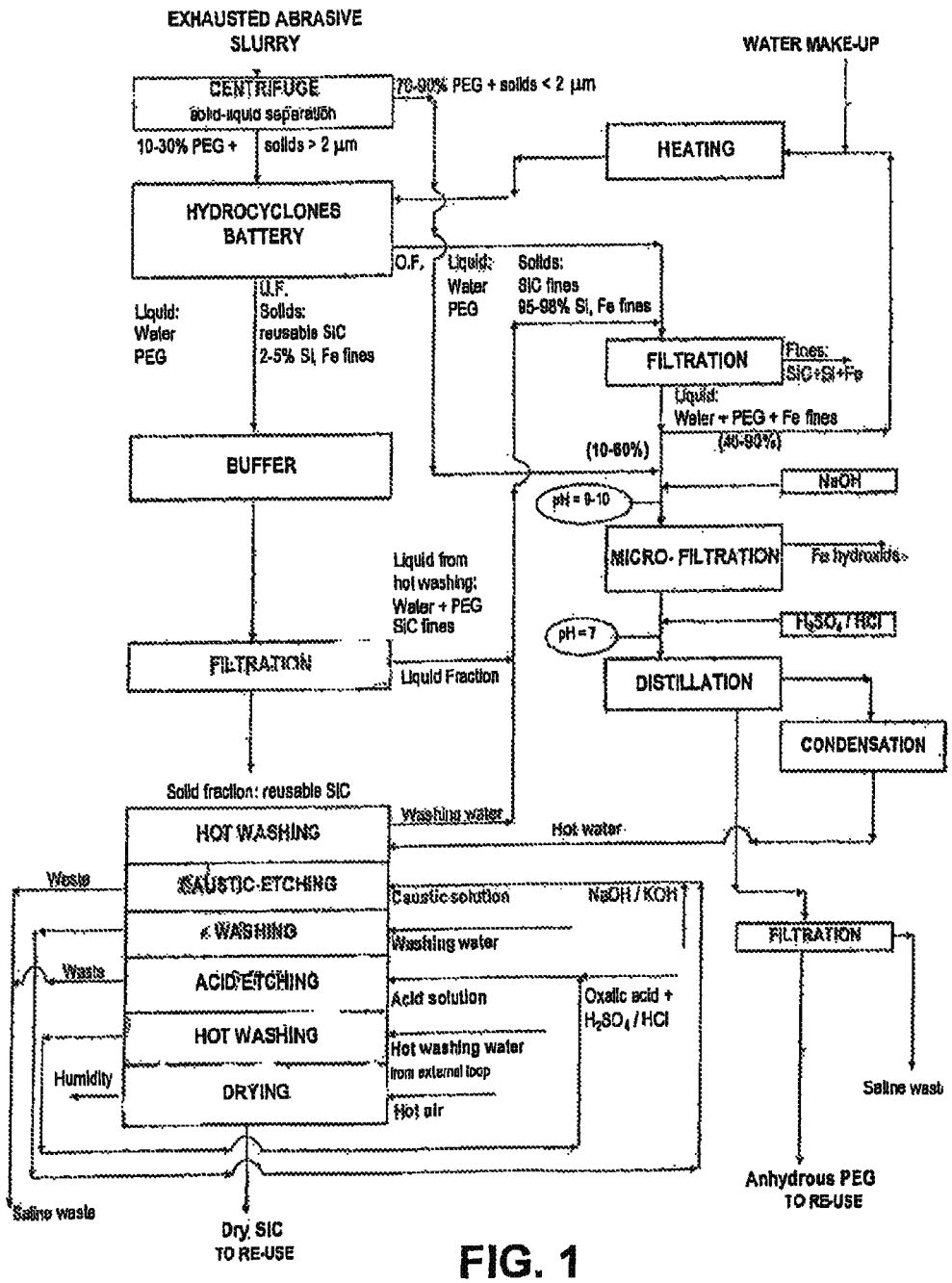

As shown in the block diagram of FIG. 1, the process according to the present invention, and the specially designed apparatus for implementing is it, are essentially composed of three interconnected sections, of which the first two (represented by the left-hand column of the diagram) are devoted to the recovery and purification of the reusable grains of the abrasive material while the third section (right-hand column) is devoted to the treatment and recovery of the suspending liquid.

The exhausted slurry corning from the silicon ingot cutting section has a solid content of 50-55% by weight and, in the case reported here for exemplification purposes, contains:

reusable silicon carbide abrasive grains which, for an abrasive suspension of large grain size (of the F500 type), have sizes between 4 and 35 μm, and for a suspension of finer grain size (of the JS 1500 or JS 2000 type) have sizes between 4 and 25 μm; in the case at hand, these account for 34-39% in weight of the exhausted slurry;

non-reusable abrasive grains, accounting for about 7% by weight of the suspension, with grain size lower than 4 μm;

fine particles of silicon, originating as dusts from the silicon ingot slicing process, which account for about 7% by weight of the suspension and have sizes not above 4 μm—these values are average values since the size and quantity of fine silicon particulates depend on the cutting conditions, on the state of exhaustion of the slurry, on the diameter of the silicon ingot being cut and so on;

fine metal particles, in particular of iron, coming from the metal wire of the cutter and from other parts of the same apparatus; that account for about 2% by weight of the exhausted slurry—here, too, the amount may vary according to the conditions of the slicing process;

suspending liquid (cutting fluid), which may be of water-soluble base, such as PEG, or oil-based; in the example reported here, the abrasive suspension is PEG-based.

The aforesaid exhausted slurry is sent to a solid-liquid centrifugal separator (centrifuge) which feeds the suspension (a) rich in solids obtained from it, containing about 30% of PEG together with grains of size >2 μm, to a hydrocyclone battery shown as only a single block in FIG. 1. The said battery in the example shown in more detail in FIG. 3, includes five hydrocyclones connected in series plus a safety hydrocyclone.

Figure 3:
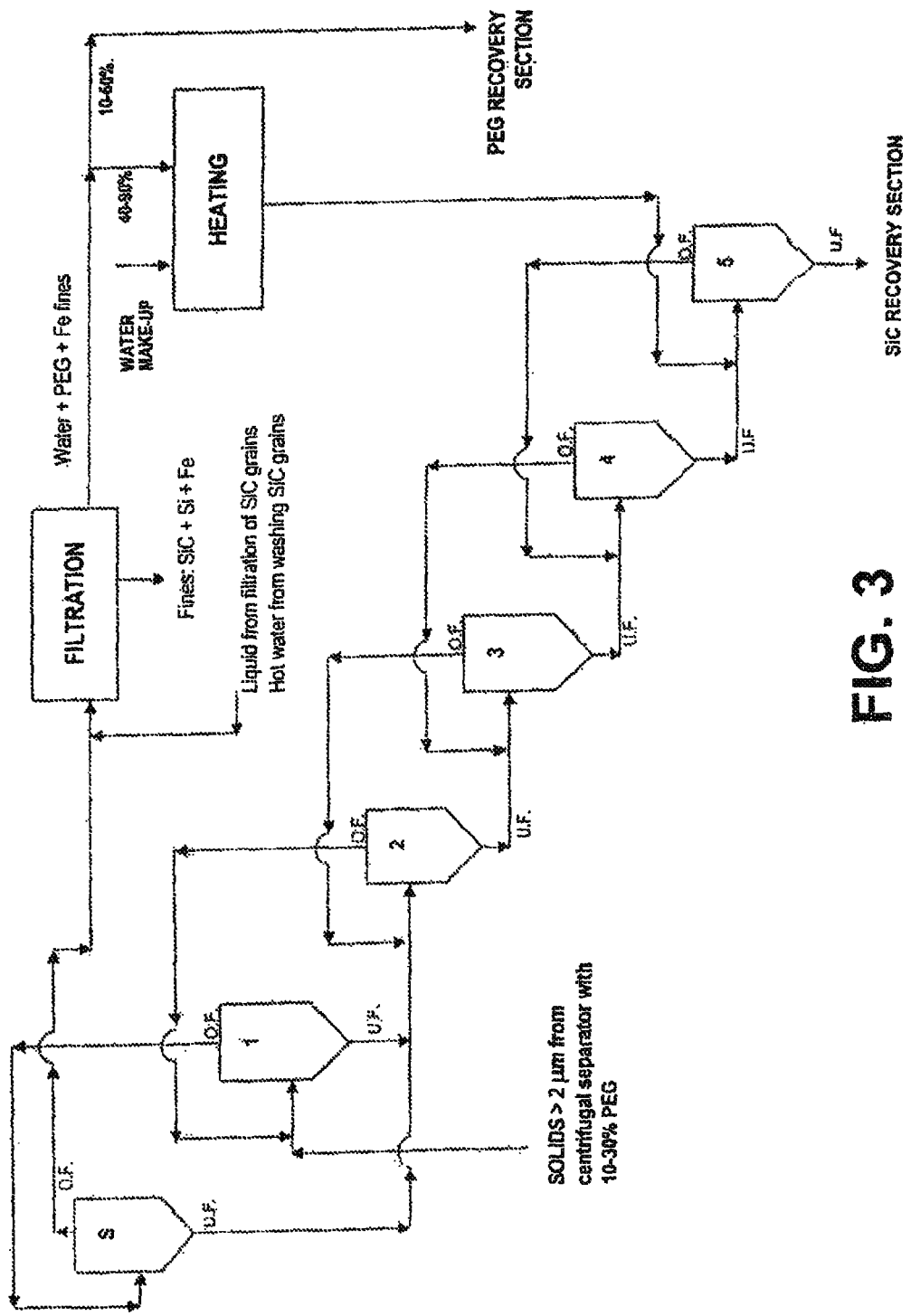
FIG. 3 shows a simplified apparatus arrangement of a battery of hydrocyclones connected in series that, together with the liquid-solid centrifugal separator, represent the first section of the apparatus, as well as the first operation of the third section of the apparatus, which carries out the recovery of the suspending liquid.

As shown in FIG. 3, the hydrocyclone battery receives the exhausted slurry in the first hydrocyclone while the last hydrocyclone of the battery receives in counter-current a portion (about 40-90%, and preferably 70-80%) of the clarified liquid obtained from the first operation (filtration) of the treatment of the overflow of the hydrocyclone battery for PEG recovery. To this liquid undergoing filtration there is also added the fraction of liquid recovered from the filtration of the abrasive grains and from the subsequent hot washing carried out in the section for abrasive grain treatment (see FIG. 1). To the recycled clarified liquid some make-up water is added which, in the case illustrated, is about 5% of the entire quantity of water circulating in the system, and quantitatively equal to the water lost as humidity in the final phase of drying of the recovered abrasive grains (see FIG. 1).

As already noted, the UF of each hydrocyclone is fed to the next hydrocyclone, supplemented with the overflow from the next but one hydrocyclone. The particle size distribution of the abrasive grain suspension is progressively restricted passing from one hydrocyclone to the next until, from the underflow of the last hydrocyclone, a suspension is obtained that is virtually free from fine silicon carbide particles and which contains as unwanted solids only a part (about 2-5%) of the fine silicon and metal particles. As shown in FIG. 3, before being sent to the filtration section, the overflow of the first hydrocyclone is made to pass into another, safety, hydrocyclone, which protects the system against saturation of the first hydrocyclone. The overflow of the safety hydrocyclone goes to filtration which, as already noted, represents the first operation of the thud section of the process, in order to recover the PEG, while its underflow is combined with the underflow of the first hydrocyclone.

As shown in FIG. 1, the abrasive grain-rich flow obtained from the hydrocyclone battery is fed to the buffer tank, which disconnects the continuous process carried out in the hydrocyclone battery from the discontinuous one carried out in the multifunctional apparatus of filtration and treatment of the recovered abrasive grains.

Figure 4:
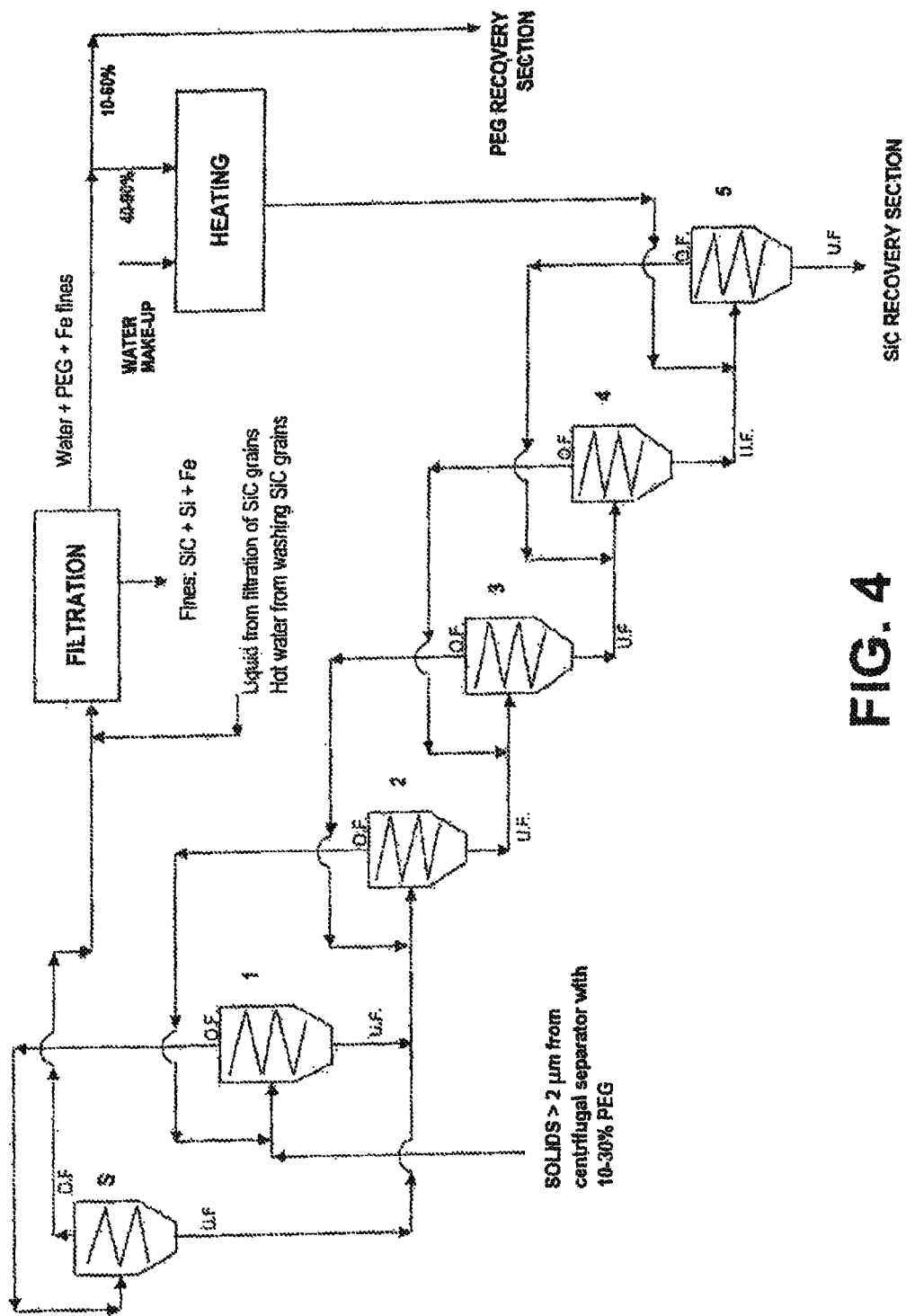
FIG. 4 shows a simplified apparatus arrangement of a battery of centrifuges as an alternative to the battery of hydrocyclones of FIG. 3.

According to an alternative solution of the first section of the process, the same series of treatments of wet size-sorting carried out in the hydrocyclone battery of FIG. 3 may be carried out in a similar manner in a battery of centrifuges of the type illustrated in FIG. 4, with a similar connection scheme of the various apparatuses.

Turning to FIG. 1, the suspension of reusable abrasive grains is then taken from the buffer tank to be treated in the multifunctional apparatus according to the present invention, where it is first pressure filtered, producing a solid fraction essentially containing the reusable abrasive grains, that remains in the apparatus, and a liquid fraction essentially containing water, PEG and fine silicon carbide particles. This fraction is fed back to the filtration section of the suspending liquid obtained as overflow of the hydrocyclone battery.

It must be noted that in FIG. 1 all the blocks concerning the operations carried cut without transferring the solid inside the multifunctional apparatus of the present invention are highlighted in grey.

After filtering, the mass of abrasive grains is washed in hot water coming from the third section of the system, recovered by distilling the mixture with PEG and then condensing the steam obtained. Also the liquid obtained from the washing is fed back to the PEG filtration section. The abrasive grains left inside the multifunctional apparatus are then treated, in two consecutive phases, with an aqueous solution of caustic soda or caustic potassium in order to obtain the etching of the silicon particles, and then washed with water coming from an external loop. Then, they are treated in an acid solution of oxalic acid (or nitric, hydrochloric, sulfuric or tartaric acid) in order to obtain the etching of the metal particles still adsorbed on the grains, and then washed with water coming from an external loop. The liquid streams obtained from these operations of caustic and acid etching are mixed and discarded as saline waste, while the liquid stream obtained from washing after caustic etching is mixed with a fresh solution of sodium or potassium hydroxide and used for caustic etching. Similarly, the liquid stream obtained from washing after acid etching is mixed with a fresh solution of oxalic acid supplemented with sulfuric/hydrochloric acid and used for acid etching.

The last phase of recovery of the reusable abrasive grains, still carried out in the same apparatus, consists of drying the purified grains—an operation that can be carried out by forcing hot air onto the bed of grains. The maximum content of humidity of the recovered grains is not above 0.05%, while the total yield of the recoverable abrasive grains in the process is in the range 85-95%.

Besides the already rioted advantage of not requiring any transfer of the granular material from one apparatus to another to carry out the various treatments required, the proposed multifunctional apparatus according to the present invention also has the advantage—by working under pressure—of enabling the adoption of even high working temperatures (up to 180° C.) without leading to problems of boiling of the liquid undergoing treatment. Moreover, it has a water consumption that is about $\frac{1}{10}$ that of a conventional continuous filter, it can also be used for even very fine particles of abrasive material without risking clogging of the filter cake, and, finally, requires filter cleaning operations that are very simple compared to those which would have to be used if the same operations were carried out in several vessels.

Still with reference to FIG. 1, the third section of the process, devoted to recovering the suspending liquid and the solvent includes—as already noted and according to the alternative solution illustrated in this figure—the filtration of the overflow coming from the hydrocyclone battery (i.e. from the top of the safety hydrocyclone of the battery). This suspension in the illustrated example, contains fine silicon carbide particles, as well as 95-98% of the fine metal and silicon particulates, in a mixture of PEG and water. The ratio between water and PEG is in the range (1-5):1, and preferably is equal to about 3:1. As already noted, this suspension is also added with some portions of suspension fed back to the system from the first phases of the section of abrasive grains treatment.

A quantity of about 40-90% (preferably 70-80%) of the liquid obtained from filtration is fed back—while adding any make-up water—into the hydrocyclone battery, after appropriate heating, while the remaining liquid is sent to the next phases of PEG and water recovery.

The liquid, which is joined with the liquid fraction, containing 70-90% of the PEG present in the exhausted slurry, separated by the initial centrifugal separator, is first added with a solution of sodium hydroxide in order to alkalinize the filtrate to a pH between 9 and 10, and then undergoes microfiltration. This eliminates the fine particulate of precipitated iron hydroxide. Then, the suspension is neutralized with hydrochloric or sulfuric acid and subjected to distillation. From this operation, the evaporated water can be recovered by condensation in order to be reused in the hot washing of the abrasive grains recovered in the second section of the apparatus.

The high-boiling component remaining as a residue of the distillation is composed of anhydrous PEG, which must be filtered to eliminate the salt (sodium chloride/sulfate) formed in the neutralization operation.

Figure 2:
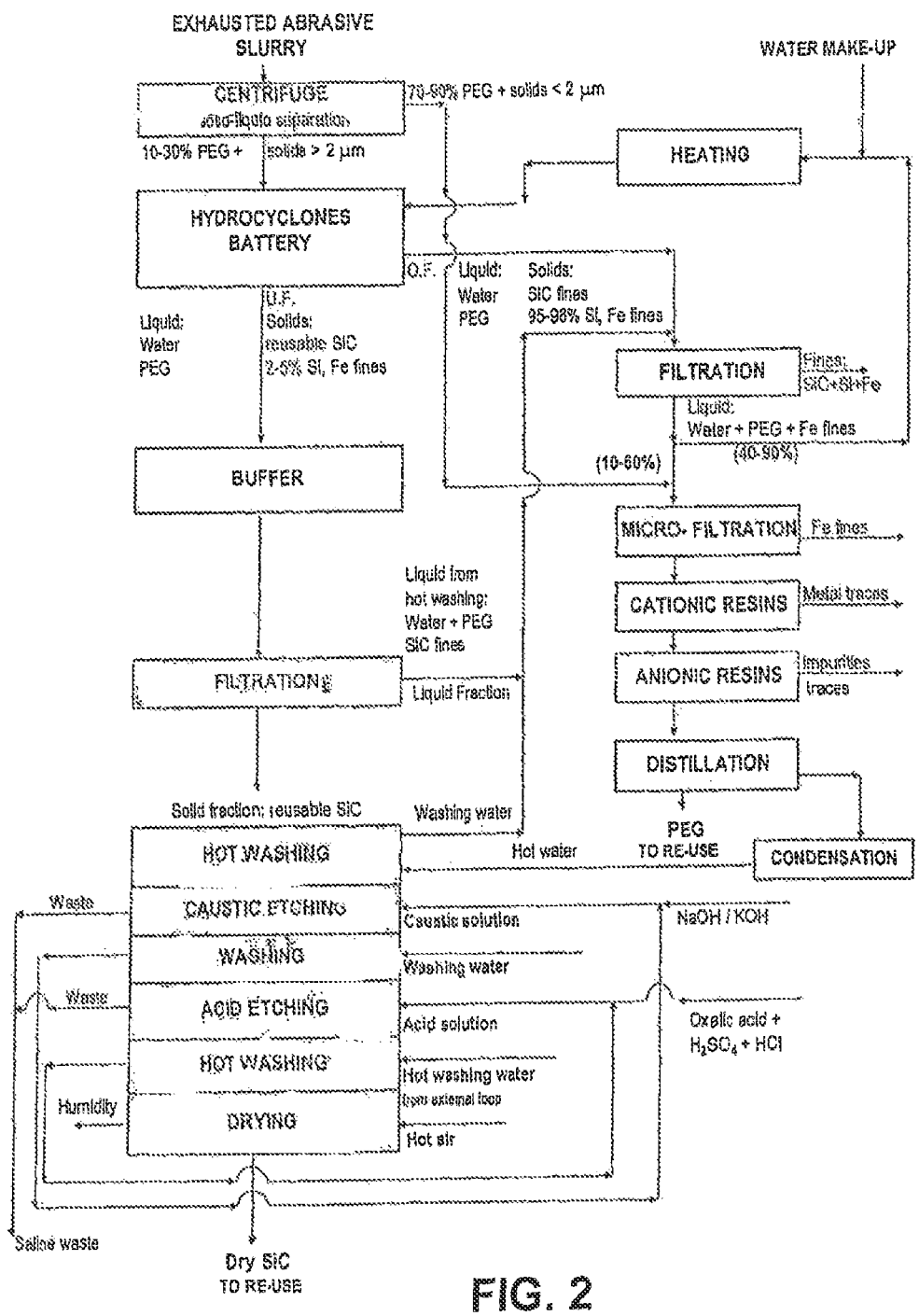
FIG. 2 shows an overall block diagram of a second process for treating exhausted abrasive slurries according to the present invention.

An alternative process scheme for the third section of the process according to the present invention, i.e. the section of PEG recovery, is shown in FIG. 2. This reports phases similar to those shown in FIG. 1 for the first two sections, and differs only for the third section. In this case, the liquid stream coming from the microfiltration, to which is added the liquid fraction from the initial centrifugal separator, is not alkalinized, but is directly subjected to a microfiltration which eliminates the fine metal particulate (essentially iron). The further traces of dissolved metals and of other impurities are eliminated by passing the liquid stream on beds of ion-exchange resins. Preferably, instead of using mixed beds, the liquid flow is first made to pass over a bed of cationic resins and then over a bed of anionic resins.

At the end of this treatment, the liquid flow solely consists of s binary mixture of PEG and water, from which the water can be recovered by evaporation, leaving the PEG purified and totally free from solids. This can be directly fed to the slicing process. The total yield of suspending liquid, meant as the ratio between the PEG obtained as a final product of the third section of the process described and the one entering with the exhausted abrasive slurry, is in the range of 85-95%.

The present invention has been disclosed with particular reference to is some specific embodiments thereof, but it should be understood that modifications and changes may be made by the persons skilled in the art without departing from the scope of the invention as defined in the appended claims.

The invention claimed is:

1. An apparatus for treating exhausted abrasive slurries including a suspending liquid, reusable abrasive grains, fine abrasive grains, fine silicon particles and fine metal particles, including the following interconnected elements:

a first centrifuge, comprising an underflow and an overflow,
a battery of separators in series, wherein the battery of separators comprises at least two separators including a first separator and a second separator, wherein an underflow of the first separator is fed to the second separator and an overflow of the second separator in the series is fed to the first separator, and wherein the separators are either hydrocyclones or centrifuges each including an underflow, an overflow, and an inlet;
a filter including a liquid outlet,
a multifunctional apparatus adapted to perform the following steps A)-D) without any transfer of material:
  A) filtering a liquid suspension to obtain a solid fraction,
  B) washing the solid fraction to obtain a washed solid fraction,
  C) leaching from the washed solid fraction, by chemical etching, any fine silicon particles and fine metal particles to obtain a washed and leached solid fraction, and,
  D) drying the washed and leached solid fraction to obtain dry abrasive grains, wherein the multifunctional apparatus includes an inlet;
a treatment section for recovering suspension liquid, the treatment section comprising means for solid-liquid separation treatments and means for liquid-solvent distillation;
wherein the underflow of the first centrifuge is connected to the inlet of the first separator of the battery, the overflow of the first centrifuge is connected to the treatment section, the overflow of the first separator is connected to the filter, the liquid outlet of the filter is connected to the inlet of the final separator of the battery and to the treatment section, and the underflow of the final separator of the battery is connected to the inlet of the multifunctional apparatus.

2. An apparatus according to claim 1, wherein a safety hydrocyclone or centrifuge, including an overflow, is connected to the overflow of the first separator of the battery, and the overflow of the safety hydrocyclone or centrifuge is connected to the filter.

3. An apparatus according to claim 2, wherein the multifunctional apparatus for filtering and treating the abrasive grains is a batch-operating apparatus consisting of a pressure vessel containing a filter device adapted to perform step A), wherein the solid fraction is housed on the filter device during steps B)-D).

4. An apparatus according to claim 3, further comprising a buffer tank between the underflow of the final separator of the battery and the inlet of the multifunctional apparatus.

5. An apparatus according to claim 4, wherein the means for solid-liquid separation in the treatment section is a microfiltration device and the means for liquid-solvent distillation in the treatment devise is an evaporator adapted to separate a solvent from the suspending liquid by distillation.

6. An apparatus according to claim 5, wherein the treatment section includes a filter device for eliminating any saline residues from the suspending liquid left over from distillation in the evaporator.

7. An apparatus according to claim 6, wherein the treatment section further includes one or more devices adapted for treatment by ion-exchange resins.

8. A process for treating an exhausted abrasive slurry including a suspending liquid, reusable abrasive grains, fine abrasive grains, fine silicon particles and fine metal particles in the apparatus of claim 1, comprising:
separating the exhausted abrasive slurry by wet size-sorting treatment in the centrifuge into a first liquid suspension containing part of the suspending liquid and the reusable abrasive grains, and
a second liquid suspension containing the remaining part of the suspending liquid and the fine abrasive grains as well as the fine silicon particles and fine metal particles;
feeding the first liquid suspension to the first separator of the battery,
obtaining a third liquid suspension from the overflow of the first separator of the battery,
subjecting the third liquid suspension to filtration in the filter to obtain a fourth liquid suspension, and joining a first portion of the fourth liquid suspension to the second liquid suspension to provide a fifth liquid suspension;
adding a solvent to the remaining portion of the fourth liquid suspension to obtain a liquid, and feeding the liquid to the final separator of the battery,
obtaining a sixth liquid suspension from the underflow of the final separator of the battery, wherein the sixth liquid suspension contains the reusable abrasive grains and is substantially free from fine abrasive grains,
further treating the sixth liquid suspension in the multifunctional apparatus implementing the following steps A)-D) without any transfer of material:
  A) filtering the sixth liquid suspension to obtain a solid fraction,
  B) washing the solid fraction to obtain a washed solid fraction,
  C) leaching from the washed solid fraction, by chemical etching, any fine silicon particles and fine metal particles to obtain a washed and leached solid fraction, and,
  D) drying the washed and leached solid fraction to obtain dry abrasive grains,
and recovering the suspending liquid from the fifth liquid suspension by means of solid-liquid separation treatments combined with liquid-solvent distillation in the treatment section.

9. A process for treating an exhausted abrasive slurry including a suspending liquid, reusable abrasive grains, fine abrasive grains, fine silicon particles and fine metal particles, comprising the following steps:
separating the exhausted abrasive slurry by wet size-sorting treatment in a centrifuge into
a first liquid suspension containing part of the suspending liquid and the reusable abrasive grains, and
a second liquid suspension containing the remaining part of the suspending liquid and the fine abrasive grains as well as the fine silicon particles and fine metal particles;
providing a battery of separators in series, wherein the battery of separators comprises at least two separators including a first separator and a second separator, wherein an underflow of the first separator is fed to the second separator and an overflow of the second separator in the series is fed to the first separator, and wherein the separators are either hydrocyclones or centrifuges,
the first liquid suspension is fed to the first separator of the battery,
a third liquid suspension is obtained from an overflow of the first separator of the battery,
subjecting the third liquid suspension to filtration to obtain a fourth liquid suspension and joining a first portion of the fourth liquid suspension to the second liquid suspension to provide a fifth liquid suspension;
adding a solvent to the remaining portion of the fourth liquid suspension to obtain a liquid and feeding the liquid to the final separator of the battery,
obtaining a sixth liquid suspension from an underflow of the final separator of the battery, wherein the sixth liquid suspension contains the reusable abrasive grains and is substantially free from fine abrasive grains,
further treating the sixth liquid suspension in a multifunctional apparatus implementing the following consecutive steps A)-D) without any transfer of material:
  A) filtering the sixth liquid suspension to obtain a solid fraction,
  B) washing the solid fraction to obtain a washed solid fraction,
  C) leaching from the washed solid fraction, by chemical etching, any fine silicon particles and fine metal particles to obtain a washed and leached solid fraction, and,
  D) drying the washed and leeched solid fraction to obtain dry abrasive grains,
and recovering the suspending liquid from the fifth liquid suspension by means of solid-liquid separation treatments combined with liquid-solvent distillation.

10. A process according to claim 9, where the battery of separators is composed of 3-6 hydrocyclones or centrifuges connected in series.

11. A process according to claim 10, wherein
step B) includes washing the solid fraction resulting from step A), using a liquid solvent; and
step C) includes leaching, by chemical etching, any fine silicon and metal particles of the washed solid fraction resulting from step B) to obtain a leached solid fraction and a silicate solution and solutions of salts of metal impurities dissolved in a waste liquid; and further includes the step of washing the leached solid fraction using a liquid solvent to obtain the washed and leached solid fraction.

12. A process according to claim 11, wherein the step C) of leaching by chemical etching comprises the following two consecutive steps:
  C1) caustic etching of the fine silicon particles by treating the solid fraction resulting from step B) with an alkaline agent solution;
  C2) alkaline etching of the metal fine particles by treating the solid fraction resulting from step C1) with an acid agent solution.

13. A process according to claim 12, wherein the acid agent solution comprises an acid selected from the group consisting of nitric acid, hydrochloric acid, oxalic acid, sulfuric acid, citric acid and tartaric acid or their mixtures, and the alkaline agent solution comprises an alkaline agent selected from the group consisting of caustic soda and potassium hydroxide.

14. A process according claim 11, wherein the third liquid suspension is treated in a safety hydrocyclone or centrifuge, and the suspension obtained from the overflow of the safety hydrocyclone or centrifuge undergoes filtration.

15. A process according to claim 14, comprising alkalinizing the fifth liquid suspension to pH 9-10 by adding an alkaline solution, and obtaining an alkalinized liquid fraction comprising iron hydroxide.

16. A process according to claim 15, comprising subjecting the alkalinized liquid fraction to microfiltration to eliminate iron hydroxide, and obtaining a clarified liquid from the microfiltration comprising solvent and suspension liquid.

17. A process according to claim 16, comprising neutralizing the clarified liquid from the microfiltration by adding an acid solution to obtain a neutralized clarified liquid and distilling the neutralized clarified liquid in order to separate the solvent from the suspension liquid by evaporation.

18. A process according to claim 17, wherein the suspension liquid is further purified by filtration, in order to eliminate any salt that is formed upon neutralization.

19. A process according to claim 17, wherein the solvent is then condensed and reused in the washing phases B) and/or C) of the abrasive grains in the multifunctional apparatus.

20. A process according to claim 14, wherein the remaining portion of the fourth liquid suspension is larger than the first portion of the fourth liquid suspension.

21. A process according to claim 14, wherein the remaining portion of the fourth liquid suspension constitutes 40-90% of the fourth liquid suspension.

22. A process according to claim 21, wherein the remaining portion of the fourth liquid suspension is heated before being fed to the battery of separators.

23. A process according to claim 14, wherein the further liquid fraction undergoes microfiltration to eliminate most of any fine metal particulate.

24. A process according to claim 23, wherein the liquid obtained from the microfiltration undergoes further treatment on ion-exchange resins to eliminate traces of metals and other impurities from the liquid, comprising a first treatment on cationic resins and a second treatment on anionic resins.

25. A process according to claim 24, wherein the liquid obtained from the treatment with ion-exchange resins undergoes distillation to separate, by evaporation, solvent from the suspension liquid.

26. A process according to claim 9, wherein the suspending liquid of the abrasive slurry is polyethylene glycol (PEG) and the liquid solvent is water.

\* \* \* \* \*